United States Patent [19]

Schultz et al.

[11] Patent Number: 5,137,587
[45] Date of Patent: Aug. 11, 1992

[54] PROCESS FOR THE PRODUCTION OF SHAPED BODY FROM AN ANISOTROPIC MAGNETIC MATERIAL BASED ON THE SM-FE-N SYSTEM

[75] Inventors: Ludwig Schultz, Bubenreuth; Kurt Schnitzke, Neunkirchen A Brand; Joachim Wecker, Erlangen; Matthias Katter, Dechsendorf, all of Fed. Rep. of Germany

[73] Assignee: Siemens Aktiengesellschaft, Berlin & Munich, Fed. Rep. of Germany

[21] Appl. No.: 735,651

[22] Filed: Jul. 25, 1991

[30] Foreign Application Priority Data

Aug. 9, 1990 [DE] Fed. Rep. of Germany ....... 4025278

[51] Int. Cl.$^5$ ............................................. H01F 1/02
[52] U.S. Cl. ..................................... 148/103; 148/103; 148/104; 419/13; 419/29; 419/53
[58] Field of Search ................ 148/101, 104, 103; 419/13, 29, 53

[56] References Cited

U.S. PATENT DOCUMENTS

| 4,837,114 | 6/1989 | Hamada et al. | 427/127 |
| 4,902,357 | 2/1990 | Imaizumi | 148/103 |

FOREIGN PATENT DOCUMENTS

0134304 3/1985 European Pat. Off. .

OTHER PUBLICATIONS

J. Appl. Phys., vol. 64, No. 10, 1988, pp. 5720–5722, "Magnetic Properties and Synthesis of High iHc Sm–Ti–Fe", N. Kamprath et al.

Nato Advance Study Institue ..., 1990, "Improved Magnetic Properties by Treatment of Iron Based Intermetallic Compounds in Ammonia", J. M. D. Coey et al.

*Primary Examiner*—John P. Sheehan
*Attorney, Agent, or Firm*—Kenyon & Kenyon

[57] ABSTRACT

A shaped body of anisotropic magnetic material based on the Sm-Fe-N system which has a crystalline, hard magnetic phase with a $Th_2Zn_{17}$ crystal structure, wherein N atoms are incorporated in the crystal lattice, is produced by compacting a powder Sm-Fe preliminary product with an Sm-Fe phase having a magnetically isotropic structure, followed by hot-shaping to provide an intermediate product with a Sm-Fe phase having a magnetically anisotropic structure, followed by heat treating the intermediate product in a nitrogen atmosphere to provide a Sm-Fe-N hard magnetic phase.

20 Claims, 1 Drawing Sheet

PROCESS FOR THE PRODUCTION OF SHAPED BODY FROM AN ANISOTROPIC MAGNETIC MATERIAL BASED ON THE SM-FE-N SYSTEM

FIELD OF THE INVENTION

This invention relates to processes for the production of a shaped body from an anisotropic magnetic material based on the substance system Sm-Fe-N, which has a crystalline, hard magnetic phase with a $Th_2Zn_{17}$ crystal structure and wherein N atoms are incorporated in the crystal lattice. In this process, an intermediate product of the magnetic material to be produced having a two-component Sm-Fe phase of a composition at least largely corresponding to the constitution of the crystal structure is heat-treated in a nitrogen atmosphere and is processed to a shaped body.

BACKGROUND OF THE INVENTION

For some years, magnetic materials have been known based on substance systems which contain a rare earth metal and a transition metal and which are outstanding for their high coercive field strength $H_{ci}$ and high energy products $(B*H)_{max}$. Important representatives are Co-Sm binary substance systems and Nd-Fe-B ternary substance systems. Their hard magnetic properties are due to intermetallic compounds of high magnetic anisotropy and high structure development in the respective materials. Production of these magnetic materials can be effected, e.g., by sintering powders of the components of the respective substance system (See, e.g., EP-A-0134304). Another possibility is to produce corresponding magnetic materials by means of a so-called rapid solidification (quenching) technology (See, e.g. EP-A-0284832).

Sm-Fe-Ti ternary magnetic materials are also being discussed (See, "J. Appl. Phys.", Vol. 64, No. 10, 1988, pages 5720 to 5722). Recently, the existence of $Sm_2Fe_{17}N_x$ as a magnetic material has become known. This material has the known $Th_2Zn_{17}$ crystal structure, with its intrinsic properties being clearly better than those of $Nd_2Fe_{14}B$. Thus, for example, the anisotropy field at room temperature is about 20 T, the Curie temperature about 470° C., and the saturation magnetization about 1.54 T. For the production of $Sm_2Fe_{17}N_x$, the melting of $Sm_2Fe_{17}$ as the starting material is known. The intermediate product thus obtained is then heated in a $N_2$ or $NH_3$ atmosphere, with the desired hard magnetic phase formed by inclusion of up to 2.7 N atoms per formula unit into the lattice structure of the preliminary product. Furthermore, by nitriding the $Sm_2Fe_{17}$ intermediate product, a uniaxial magnetic anisotropy of the hard magnetic phase can be obtained. (See paper read by J.M.D. Coey at the convention of the "Nato Advanced Study Institute on the Science and Technology of Nanostructured Magnetic Materials", Jun. 25 to Jul. 7, 1990, Harklion, Crete, Greece).

OBJECTS OF THE INVENTION

It is an object of the present invention to improve this known process for the production of a hard magnetic material on the basis of the substance system Sm-Fe-N so that the development of the desired hard magnetic phase in a relatively simple manner can be ensured, and a material of high coercive field strength $H_{ci}$, particularly greater than 5 kA/cm, can be obtained and which permits the production of anisotropic compact Sm-Fe-N shaped bodies as, e.g., permanent magnets.

These and other objects of the present invention will become apparent from the following description and claims in conjunction with the drawings.

SUMMARY OF THE INVENTION

According to the present invention, first a preliminary product in powder form is compacted at elevated temperature to form a compact with a magnetically isotropic structure of the Sm-Fe phase. Then, by means of an oriented hot shaping step, the compact is transformed into an intermediate product with a magnetically anisotropic structure of the Sm-Fe phase. Thereafter, the hard magnetic phase of the substance system Sm-Fe-N is adjusted in the intermediate product by means of the heat treatment in a nitrogen atmosphere.

The present invention proceeds from the known fact that by the inclusion of N atoms within the known $Th_2Zn_{17}$ crystal structure, a material having hard magnetic properties can be obtained without alteration of the lattice type. To get to an anisotropic compact shaped body of this material, a compact intermediate product is produced, according to the present invention, from a preliminary product in powder form which contains the binary $Sm_2Fe_{17}$ phase in isotropic form. For this purpose, first a compact, which is still magnetically isotropic, is formed from a powder of the preliminary product. To produce a magnetic anisotropy in this compact, the compact is subjected to an appropriate hot shaping pressing step. The shaping forces act substantially in one direction only and the magnetic anisotropy adjusts itself with the easy direction of magnetization parallel to the force direction. Such oriented hot shaping steps are generally known under the designation "die upsetting". (See, "Appl. Phys. Lett.", Vol. 46, No. 8, 1985, pages 790 and 791; Vol. 53, No. 4, 1988, pages 342 and 343; or "IEEE Trans. Magn.", Vol. MAG-21, No. 5, 1985, pages 1958 to 1963). An analogous hot shaping step already has been applied for the formation of the hard magnetic phase of the substance system Nd-Fe-B. (See DE-OS 38 32 472). According to the present invention, however, this known process step is to serve, not for the formation of an anisotropic, hard magnetic end product, but rather for an anisotropic intermediate product with a soft magnetic Sm-Fe phase. By this shaping, the desired shape of the body to be produced can already be adjusted. In the subsequent nitriding of the intermediate body, the desired hard magnetic phase of the substance system Sm-Fe-N is produced in a known manner with the magnetic anisotropy being preserved. The more porous the intermediate body, the faster the nitriding occurs. The process of the present invention thus permits relatively simple and reproducible production of the bodies of any shape of a permanent magnet material with the three-component substance system Sm-Fe-N.

DETAILED DESCRIPTION

A detailed description of preferred embodiments of the present invention will now be provided with reference to the examples and the drawings.

To obtain a compact, hard magnetic shaped body of the substance system Sm-Fe-N, first a preliminary product is produced in powder form with a $Sm_2Fe_{17}$ phase. By a material with the $Sm_2$-$Fe_{17}$ phase is understood, in the process according to the present invention, generally any material with a phase of the binary system Sm-Fe which has the $Th_2Zn_{17}$ crystal structure. The proportions of the individual components of this material need not correspond exactly to the composition $Sm_2Fe_{17}$. For the production of the preliminary product, one starts with powders consisting of or containing the components involved, which are sufficiently pure (e.g., a minimum purity of 99.5%). Either elementary powders are used, or alternatively, the elements involved may be present in the form of alloys and/or compounds. The pulverulent starting components of the preliminary product are then processed to a prealloy. The percentages of the individual components are chosen so that the prealloy has the composition $Sm_xFe_{100-x}$ x being between 10 and 20 (in atom-%). The prealloy can be obtained very advantageously, in a well known manner, i.e., by mechanical alloying in a milling apparatus suitable for the purpose. (See, e.g., "Metallurgical Transactions", Vol. 5, Aug. 1974, pages 1929 to 1934, or EP-B-0243641). Equally suitable for this purpose is the known rapid solidification quenching technology, in particular, so-called "melt spinning". (See, e.g., "Zeitschrift fur Metallkunde", Vol. 69, No. 4, 1978, pages 212 to 220 or DE-PS 37 16 005). The prealloy produced, which ultimately has, for example, the composition $Sm_{2.2}Fe_{17}$, can then be placed in a suitable milling apparatus and ground to an average grain size of between 0.2 $\mu$m and 50 $\mu$m, preferably between 1 $\mu$m and 10 $\mu$m. The powder is here still isotropic, as it is nano- or micro-crystalline.

Figure 1:
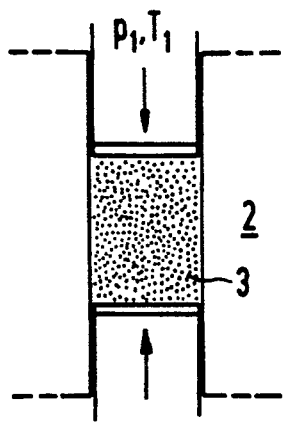
FIGS. 1 to 6 illustrate process steps in accordance with the present invention.
Figure 2:
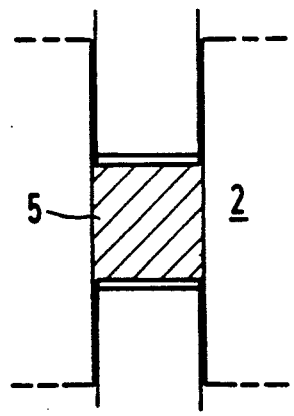

Thereafter, this powder of the preliminary product is placed, with reference to FIG. 1, into a hot-pressing device 2. With this press, the pulverized preliminary product labeled 3 is compacted at a pressure $p_I$ per area unit of between about 0.2 kbar and 5 kbar, for example, about 1 kbar at elevated temperature $T_1$. The pressing temperature $T_1$ for this hot pressing is generally chosen between 500° C. and 1000° C. At the end of this process step, a compact 5 has been formed which has approximately 80% to 100%, preferably 90% to 95% of the maximum density. See FIG. 2 The compact has the soft magnetic $Sm_2Fe_{17}$ phase present in isotropic form.

Figure 3:
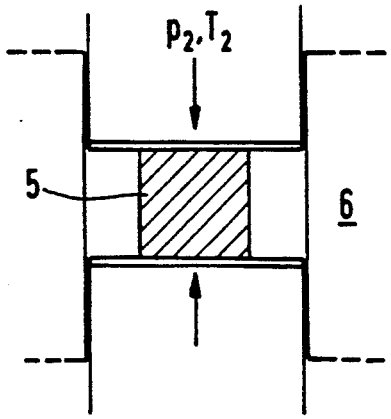

To obtain a body with a magnetically anisotropic structure of this phase, the compact 5, with reference to FIG. 3, is thereafter subjected to an oriented hot shaping step at a temperature $T_2$. The orienting mechanisms acting here are similar to those in the so-called "die upsetting". To this end, the compact 5 is shaped in a shaping equipment 6 without substantial volume change to the form of the shaped body to be produced. A shaping pressure $p_2$ is generally on the order of magnitude of the pressure $p_1$ for compacting the pulverized preliminary product. During the shaping step, the shaping temperature $T_2$ is maintained between 600° C and 1000° C.

Figure 4:
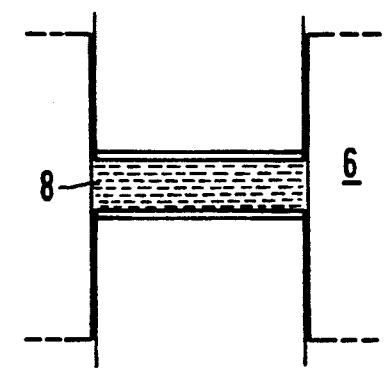

The shaped intermediate product thus obtained is illustrated in FIG. 4 and labeled 8. The product now shows an anisotropic structure of the binary, soft magnetic Sm-Fe phase with a $Th_2Zn_{17}$ crystal structure, as well as, the shape that the body to be produced is to have. In a further step, this intermediate product 8 is thereafter annealed in a nitrogen atmosphere in order to adjust the desired hard magnetic $Sm_2Fe_{17}N_x$ phase. In this regard, it was noted that this compound exists for nitrogen concentrations x for which $0 < x \leq 3$ (x in N atoms per unit cell). As this phase is unstable above about 600° C., the annealing temperature to be chosen must be below that temperature and appropriately above 300° C.

Nitriding of compact bodies at the permissible annealing temperatures, however, is very slow. The respective times are reduced to a few hours if the body forming the intermediate product has a density below 100% because then the nitrogen can spread unhindered into the cracks and pores of the body. Thus, only the distance between adjacent cracks or pores must be overcome by diffusion.

In addition, it is of advantage if the nitriding process is carried out in a reactive nitrogen atmosphere. An appropriate device is schematically illustrated in section in FIG. 5.

Figure 5:
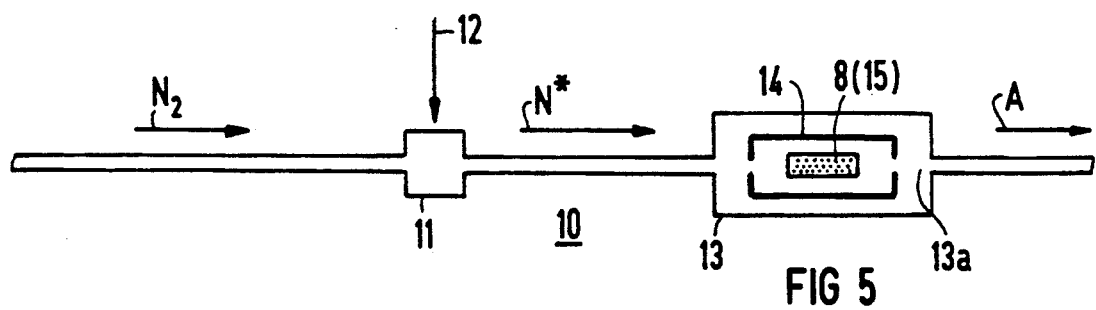
Figure 6:
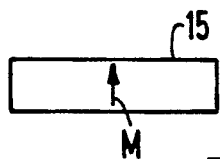

In this nitriding apparatus, generally designated by 10, molecular nitrogen $N_2$ is first introduced into a reaction chamber 11 of a gas activation equipment in order to transform it there into reactive components such as ionized atoms and molecules or free nitrogen radicals. For this purpose preferably microwave or radio-frequency excitation may be provided. The respective energy feed into the reaction chamber 11 is indicated by an arrow line 12. The nitrogen thus activated, designated by N*, is then supplied to a furnace 13, in whose interior 13a the intermediate product 8 is disposed. The intermediate product may advantageously be contained inside a laterally open quartz vessel 14, which prevents the recombination of the excited nitrogen atoms and molecules. Further, the waste gas issuing from the furnace 13 is indicated in FIG. 5 by a line marked A. The nitriding times concretely chosen for the nitriding process with activated nitrogen depend on the nitriding temperature $T_3$, and in particular, also on the density of the intermediate product body. Thus, for example, for bodies of a density of 90 to 95%, the nitriding times are generally between 10 minutes and 1000 hours, preferably between 5 hours and 30 hours. For example, a nitration of an intermediate product body having a density of about 90% at 500° C. for 10 hours is sufficient to obtain in the end product of a shaped body produced according to the present invention the desired hard magnetic $Sm_2Fe_{17}N_x$ phase with the desired preferential direction of magnetization. In FIG. 6, the shaped body is labeled 15. Its magnetic preferential direction, i.e. the so-called easy direction of magnetization, is illustrated by an arrow M.

According to the above practical example set forth above, it was assumed that the nitration of the intermediate product body 8 is carried out at a single, relatively high temperature. It is to be noted, however, that the $Th_2Zn_{17}$ phase may possibly decompose at too fast a nitration, for example, at a temperature above 500° C. The reason for this is that the thermal stability of the compound $Sm_2Fe_{17}N_x$ clearly decreases with decreasing N content. Thus, for example, the decomposition temperature for x =0.4 is about 100° C. lower than for x =2.94. For this reason, x values as high as possible (in the vicinity of x =3) must be regarded to be advantageous. The following Table 1 shows the clear dependence of the decomposition temperature $T_d$ [in ° C.] with respect to the nitrogen concentration x [in atoms per unit cell]. The stated measured values represent approximate values above which decomposition occurs (onset values):

TABLE 1

| | x [N atoms per unit cell] | | | | |
|---|---|---|---|---|---|
| | 0.5 | 1 | 1.5 | 2 | 2.5 |
| Td [°C.] | 602 | 627 | 643 | 659 | 673 |

Because of this dependence of the thermal stability of the $Sm_2Fe_{17}N_x$ compound on the nitrogen concentration, it is especially advantageous if the nitriding process of the body forming the intermediate product 8 is carried out in two stages, choosing for the first stage a temperature, for example, lower by at least 50° C. than for the second stage. A practical example of a respective two-stage nitration of an intermediate product body of predetermined density is given below.

First Nitriding Stage

The nitration occurs at a temperature $T_{n1}$ between 300° C. and 400° C. for a period $t_{n1}$ between 10 and 1000 hours, the time concretely to be chosen depending on the density of the body. That is, the denser the body is, the longer the nitriding times must be. The N loading at least in the center of the body should be at least up to a concentration $x = 1.5$. Respective examples are evident from the following Table 2.

TABLE 2

| | Density [%] | | | |
|---|---|---|---|---|
| | 95 | 95 | 90 | 90 |
| $T_{n1}$ [°C.] | 400 | 350 | 400 | 350 |
| $t_{n1}$ [h] | 64 | 256 | 16 | 64 |

Second Nitriding Stage

Further loading with nitrogen occurs up to a maximum possible concentration of $x \leq 3$ at a temperature $T_{n2}$, which is higher than the temperature $T_{n1}$ of the first nitriding stage. For an intermediate product body of a density of 90%, for example, a temperature $T_{n2}$ of 500° C. for a period $t_{n2}$ of 16 hours is provided.

In this two-stage nitriding process, advantageously the thermal stability of the $Sm_2Fe_{17}$ nitride is increased in the first nitration step to the extent that the hard magnetic phase cannot decompose at the higher temperature $T_{n2}$ necessary in the second nitration step for complete nitration.

Further, it was assumed in the previously set forth practical example that the shaped body 15 evolves directly from the intermediate product 8 with the respective shape. This shape was set in the shaping process in the pressing equipment 6. In particular, for bodies of complicated form, developing the desired form in a press may involve difficulties. According to the present invention, it is therefore possible also to pulverize the intermediate product 8, for example to mill it, and thereafter to nitride it. The average size of the respective powder particles should in general be under 40 μm. Because of the powder form of the intermediate product, it may be possible to dispense with activation of the nitrogen atmosphere for the nitriding. Also in this case, it is especially advantageous, as for a compact intermediate product body, to carry out a two-stage nitration because of the danger of possible decomposition. The times and temperature conditions of the individual nitration stages correspond substantially to those for intermediate product bodies with 90% to 95% density. The nitriding times concretely to be chosen depend, in particular, on the grain size of the powers to be nitrided.

Some examples for the first nitriding stage are evident from the following Table 3.

TABLE 3

| | Grain size [μm] | | | |
|---|---|---|---|---|
| | 10 | 10 | 5 | 5 |
| $T_{n1}$ [°C.] | 400 | 350 | 400 | 350 |
| $t_{n1}$ [h] | 64 | 256 | 16 | 64 |

The further loading with nitrogen in the second nitriding stage occurs at a temperature $T_{n2}$ which is higher than the temperature $T_{n1}$ of the first nitriding stage. For example, for a grain size of 10 μm, a temperature $T_{n2}$ of 500° C. for a period $t_{n2}$ of 16 hours is suitable.

The hard magnetic powder of the end product thus obtained can then be oriented in known manner in a DC magnetic field and be compacted to the shaped body with the desired shape. The magnetic orientation of the powder and the compacting may overlap in time at least in part. In addition, without a separate compacting step, a plastic-bound anisotropic permanent magnet can be produced from the hard magnetic, magnetically oriented powder by sealing with plastic. Here, too, the magnetic orientation of the powder and the plastic sealing need not necessarily be consecutive. The two variants for the production of a shaped body of hard magnetic, magnetically oriented powder are generally known (see, e.g., the cited DE-OS 38 32 472).

Although preferred embodiments of the present invention have been described in detail, it is contemplated that variations may be made by those skilled in the art, all within the spirit and scope of the present invention as defined in the claims.

What is claimed is:

1. In a process for the production of a shaped body from an anisotropic magnetic material based on a composition consisting essentially of Sm-Fe-N which has a crystalline, hard magnetic phase with a $Th_2Zn_{17}$ crystal structure, wherein nitrogen atoms are incorporated in the crystal lattice, said process comprising producing an intermediate product with a two component Sm-Fe phase having the $Th_2Zn_{17}$ crystal structure and heat treating the intermediate product in a nitrogen atmosphere, the improvement comprising:

providing a Sm-Fe preliminary product in powder form, compacting the powder preliminary product to produce a compact with a Sm-Fe phase having a magnetically isotropic structure;

transforming said compact by an oriented hot-shaping step into the intermediate product with a Sm-Fe phase having a magnetically anisotropic structure;

heat treating the intermediate product in a nitrogen atmosphere to provide a Sm-Fe-N hard magnetic phase.

2. A process according to claim 1 further comprising providing the powder preliminary product by mechanical alloying.

3. A process according to claim 1 further comprising providing the preliminary product by rapid solidification.

4. A process according to claim 1 further comprising compacting said powder preliminary product at a pressure between 0.2 kbar and 5 kbar at a temperature between 500° C. and 1000° C.

5. A process according to claim 1 further comprising carrying out said oriented hot shaping step at a temperature between 600° C. and 1000° C. and applying a pressure between 0.2 kbar and 5 kbar acting substantially in one direction.

6. A process according to claim 1 further comprising creating said shaped body in said hot shaping step.

7. A process according to claim 1 further comprising producing the intermediate product with a density between 80% and 100%

8. A process according to claim 7 wherein said density is 90% to 95%.

9. A process according to claim 1 further comprising:
pulverizing said intermediate product;
heat treating the pulverized intermediate product in said nitrogen atmosphere to provide a hard magnetic phase product in powder form;
orienting said hard magnetic phase product in powder form in a magnetic field, and processing the magnetically oriented hard magnetic phase product in powder form into said shaped body.

10. A process according to claim 9 further comprising compacting said oriented hard magnetic phase product in powder form to form the shaped body.

11. A process according to claim 9 further comprising bonding said oriented hard magnetic phase product in powder form with plastic to form the shaped body.

12. A process according to claim 1 wherein said heat treating of said intermediate product to provide the hard magnetic phase takes place in the nitrogen atmosphere at a temperature between 300° C. and 600° C.

13. A process according to claim 12 wherein said heat treating to provide the hard magnetic phase is a two stage process having a first stage temperature lower than a second stage temperature.

14. A process according to claim 13 wherein the first stage temperature is between 300° C. and 400° C.

15. A process according to claim 12 wherein said heat treating of said intermediate product in the nitrogen atmosphere for providing the hard magnetic phase is performed for a total time between 10 minutes and 1000 hours.

16. A process according to claim 15 wherein said time is between 5 hours and 30 hours.

17. A process according to claim 1 wherein the nitrogen atmosphere wherein said heat treating of said intermediate product to produce said hard magnetic phase takes place contains nitrogen activated components.

18. A process according to claim 9 wherein said heat treating of said pulverized intermediate product in the nitrogen atmosphere to provide the hard magnetic phase product in powder form takes place at a temperature between 300° C. and 600° C. and for a total time of between 10 minutes and 1000 hours.

19. A process according to claim 18 wherein said heat treating is a two stage process having a first stage temperature lower than a second stage temperature.

20. A process according to claim 18 wherein said heat treating is performed for a total time between 5 hours and 30 hours.

* * * * *